Jan. 1, 1952 R. C. CLERK 2,580,891
PLANETARY CHANGE-SPEED GEAR
Filed June 23, 1948
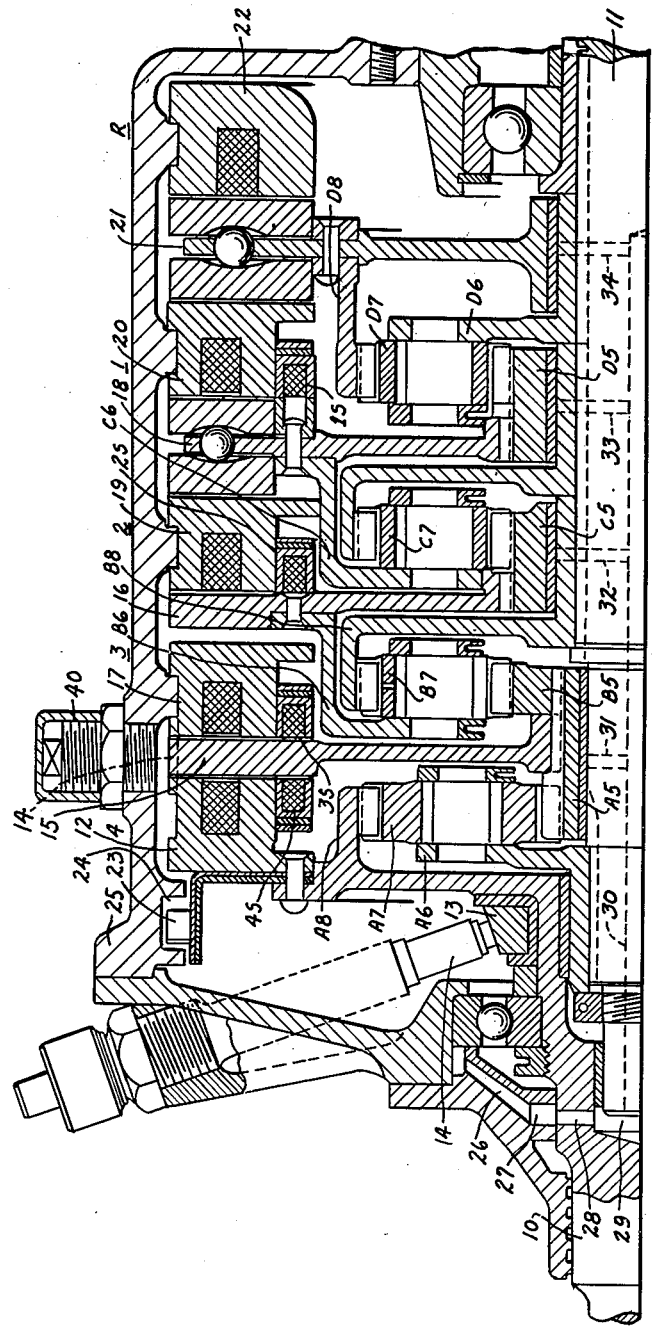
INVENTOR.
ROBERT CECIL CLERK
BY
Richardson David and Nordon
his ATTORNEYS.

Patented Jan. 1, 1952

2,580,891

UNITED STATES PATENT OFFICE 2,580,891

PLANETARY CHANGE-SPEED GEAR

Robert Cecil Clerk, Richmond, England

Application June 23, 1948, Serial No. 34,782
In Great Britain September 3, 1946

2 Claims. (Cl. 74—759)

This invention relates to planetary change-speed gears of the type having compounded gear trains.

An object of this invention is to provide a planetary change-speed gearing, preferably composed of simple gear trains each consisting of a sun gear, an annulus gear and planet wheels each meshing with the sun wheel and the annulus gear, the gearing provided high efficiencies with low gear and reaction torque loadings, particularly in the higher-speed gear ratios.

Another object is to enable the design of such a gearing to be easily modified in order to vary the gear ratios available.

Another object is to enable like parts to fulfill different functions in the gearing, with a consequent saving in cost of manufacture.

Another object is to provide a reverse ratio in planetary change-speed gearing.

Another object is to provide planetary change-speed gearing adapted in one constructional form to yield a direct drive on the highest-speed ratio, and in an alternative form to yield an overdrive highest-speed ratio and a direct drive on the next lower speed ratio.

Three embodiments of the invention, as applied to change-speed and reversing gearing, suitable for use on road motor vehicles, will be described by way of example and with reference to the accompanying drawings, in which the figure is a sectional side elevation of the upper half of a planetary change-speed and reverse gearing in accordance with the invention.

The gearing shown in the figure provides four forward ratios, the highest being direct drive, and a reverse ratio by selective operation of four brakes and a clutch. The main elements of the gearing are an input shaft 10, an output shaft 11, four simple planetary gear trains A, B, C and D, four brakes R, 1, 2 and 3, and a clutch 4. Each of the gear trains has a sun wheel 5, a planet-carrier 6, planet pinions 7 and an annulus gear 8. In the figure the references 5, 6, 7 and 8 are prefixed by the reference letter that denotes the gear train as a whole.

The annulus gear A8 of the primary train A is integral with the input shaft 10 and is fixed to an annular electromagnet 12 supplied with current through a slip ring 13 and a brush 14. The magnet 12 co-operates with an annular armature 15 to form the clutch 4, the armature 15 having a hub splined to the sun wheel A5 which is rotatable on the output shaft 11. The planet-carrier A6 is splined to the output shaft 11.

The annulus gear B8 of the secondary train is splined to the output shaft 11, the planet-carrier B6 is riveted to an annular armature 16, and the sun wheel B5 is splined to the sun wheel A5. The armature 16 co-operates with a fixed electro-magnet 17 to form the brake 3.

The annulus gear C8 of the tertiary train is splined to the output shaft 11, the planet-carrier C6 is riveted to an annular plate 18, and the sun wheel C5 is directly coupled to the planet-carrier B6 by being splined to the armature 16 which co-operates with a fixed electro-magnet 19 to form the brake 2. This sun wheel is rotatable on the hub of the annulus B8. The plate 18 forms the brakeable member of the brake 1 which is an electro-magnetic brake of the torque-assisted type as described in my patent application Serial No. 34,781, filed June 23, 1948; this brake engages in response to energizing of an annular electro-magnet 20.

The clutch 4 and the brakes 1, 2 and 3 are provided with auxiliary synchronising magnets 4S, 3S, 2S and 1S respectively. These magnets actuate switches mounted on the main electromagnets and controlling the supply of current to the latter in such a manner as to delay the energising of the main magnets until synchronism has occurred and the direction of relative rotation of the main magnet and its armature beings to reverse. The arrangement is fully described in my British Patent Specification No. 599,462.

The annulus gear D8 of the reversing train is riveted to an annular plate 21, the planet-carrier D6 is splined to the output shaft 11, and the sun wheel D5 is splined to the plate 18 and is therefore directly coupled to the planet-carrier C6, being rotatable on the hub of the annulus gear C8. The plate 21 forms the brakeable member of the brake R which is of the same kind as the brake 1, except that it has no synchronising magnet, and which engages in response to energising of an annular electro-magnet 22.

A vaned rotor 23 fixed to the annulus gear A8 and operating in an annular channel 24 in the gear-box 25 picks up oil from the bottom of the gear-box and delivers it, through a gallery not shown, to a duct 26 whence it is delivered by gravity through an annular channel 27 to a radial channel 28 in the shaft 10 leading to a counter-bore 29 containing a spigot bearing for the shaft 11. An axial bore 30 in the shaft 11 conveys the oil to radial bores 31—34 feeding the various gear trains.

The clutch 4 alone is engaged to provide fourth speed, which is direct drive, by locking train A solid.

Third speed is obtained by engaging only the brake 3. The sun wheel A5 is thereby held stationary, and the annulus gear A8 causes the planet wheels A7 to roll around the sun wheel A5, the planet-carrier A6 being thereby caused to rotate forward at a reduced speed, taking the output shaft 11 with it. The train A thus operates as a simple planetary under-drive unit.

In order to establish second speed, only the brake 2 is applied, which holds the planet-carrier B6 stationary. The mutually coupled sun wheels A5 and B5 accordingly rotate backward and drive the annulus gear B8 forward, the motions of the trains A and B being thus compounded.

For first speed only the brake 1 is applied, which holds the planet-carrier C6 stationary. The sun wheel C5 now rotates backward under the influence of the reaction on the planet-carrier B6, and drives the annulus gear C8 forward, the trains A, B and C now operating trebly compounded.

Reverse is established by applying only the brake R. The backward torque acting on the planet-carrier C6 due to the treble compounding of trains A, B and C is now applied to the sun wheel D5, and train D operates to apply through its planet-carrier D6 to the output shaft 11 a backward torque which suitably exceeds the sum of the forward torques applied to the shaft 11 by the trains A, B and C through the elements A6, B8 and C8.

In the example shown in Figure 1, the trains B, C and D have identical ratios so that similar components can be used in different parts of the gear, e. g. B8 and C8, B7, C7 and D7, and C5 and D5, while the ratio steps are suitably proportioned. Furthermore, the ratio steps obtained can be increased or decreased simultaneously throughout the four speeds merely by increasing or decreasing respectively the ratio of the train A.

In the event of failure of electric power, third speed can be engaged as an emergency measure by screwing a bolt 40, which is engaged in a hollow boss on the gear-box 25, into engagement with a notch 41 in the armature disk 15.

The term "coupled" used in the following claims means that the two elements so described are incapable of relative rotation at least in normal operation of the gearing on a ratio requiring such coupling; this term does not however exclude the use of a connection which is disengageable in particular circumstances, e. g. a free-wheel coupling.

I claim:

1. A planetary gearing yielding four forward speed ratios and including an input member, an output member, three planetary gear trains each having an annulus gear, a sun gear, and a planet-carrier carrying planet pinions each meshing with the sun and annulus gears, said trains being constituted by a primary train having its annulus gear coupled to said input member and its planet-carrier coupled to said output member, a secondary train having its sun gear coupled to the sun gear of the primary train, and a tertiary train having its sun gear coupled to the planet-carrier of the secondary train, the annulus gears of said secondary and tertiary trains being coupled to said output member, a controllable clutch operable for locking said primary train to produce therein a locked-unit drive condition, and three independently controllable brakes for preventing rotation respectively of the sun gear of said primary train, of the planet-carrier of said secondary train, and of the planet-carrier of said tertiary train.

2. A planetary gearing as claimed in claim 1, and including a reversing planetary gear train having a sun gear coupled to the planet-carrier of said tertiary train, an annulus gear, and a planet-carrier coupled to said output member and carrying planet pinions each meshing with the last-mentioned sun and annulus gears, and a controllable stop for preventing rotation of said annulus gear.

ROBERT CECIL CLERK.

REFERENCES CITED

The following references are of record in the file of this patent:

UNITED STATES PATENTS

| Number | Name | Date |
|---|---|---|
| 1,796,904 | Wilson | Mar. 17, 1931 |
| 2,127,655 | Stromquist | Aug. 23, 1938 |
| 2,159,427 | Dunn | May 23, 1939 |
| 2,162,785 | Neracher | June 20, 1939 |
| 2,272,934 | Cotal | Feb. 10, 1942 |
| 2,296,521 | Griswold | Sept. 22, 1942 |
| 2,329,724 | Mauer | Sept. 21, 1943 |
| 2,395,905 | Oetzel | Mar. 5, 1946 |
| 2,518,825 | Simpson | Aug. 15, 1950 |

FOREIGN PATENTS

| Number | Country | Date |
|---|---|---|
| 387,623 | France | July 18, 1908 |
| 614,340 | France | Dec. 11, 1926 |
| 625,318 | Great Britain | June 24, 1949 |